United States Patent [19]

Helmly, Jr. et al.

[11] Patent Number: 4,605,081
[45] Date of Patent: Aug. 12, 1986

[54] AUTOMATIC TRUCK MEASURING SYSTEM AND PROCESS

[75] Inventors: Paul K. Helmly, Jr., Richmond Hill; Fred D. Forster, Jr., Savannah, both of Ga.; Patrick E. Gower; Steven D. Holdaway, both of Houston, Tex.; Stanley W. Tutman, Naperville, Ill.; Timothy J. Beissel, Whiting, Ind.; Robert J. Needham, Chicago, Ill.; Arthur J. Lasky, Tulsa, Okla.

[73] Assignee: Standard Oil Company (Indiana), Chicago, Ill.

[21] Appl. No.: 656,034

[22] Filed: Sep. 28, 1984

[51] Int. Cl.⁴ ............... G01G 19/00; G01G 19/22; G01G 19/02
[52] U.S. Cl. .................................. 177/25; 177/1; 177/133; 364/567
[58] Field of Search ............... 177/1, 25, 134, 133, 177/245; 364/400, 567

[56] References Cited

U.S. PATENT DOCUMENTS 3,842,922  10/1974  Fagin et al. ................. 177/1
4,192,394  3/1980  Simpson .................... 177/134

Primary Examiner—E. A. Goldberg
Assistant Examiner—Patrick W. Foster
Attorney, Agent, or Firm—Thomas W. Tolpin; William T. McClain; William H. Magidson

[57] ABSTRACT

A self-operating automatic control system and process is provided to automatically measure the gross weight, load, and length of trucks, such as at refineries, truck terminals, and depots. A central processing unit compares the truck's weight and length with state highway regulations and activates a laser printer or another printer to print a bill of lading when the measured weight is within legal limits. The system and process can also have various safety and weight indicators as well as a regulated control dispenser coupled to the central processing unit to automatically and remotely dispense authorized legal amounts of the load of material, such as gasoline or oil, into the trucks.

12 Claims, 12 Drawing Figures

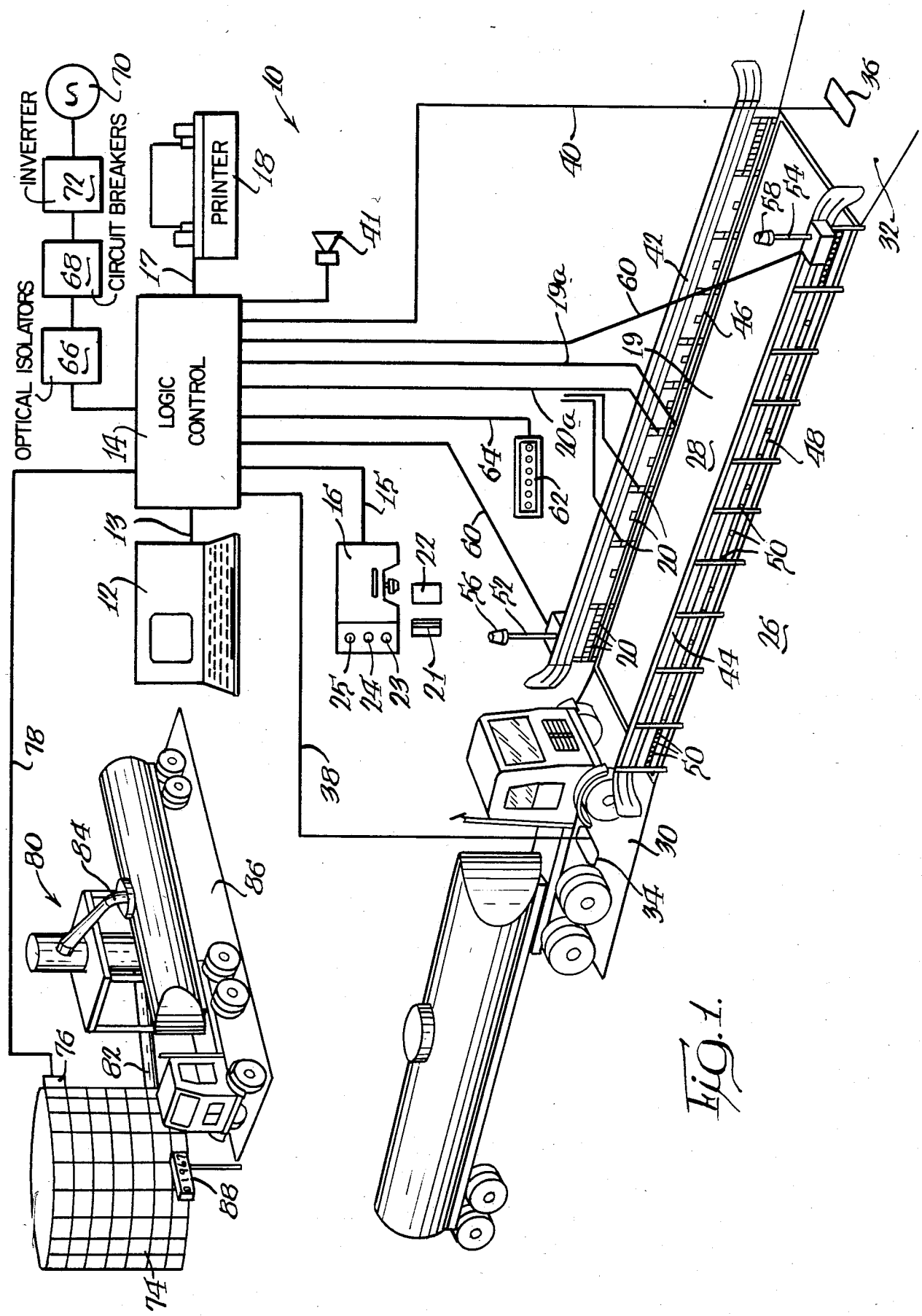

AUTOMATIC TRUCK MEASURING SYSTEM AND PROCESS

BACKGROUND OF THE INVENTION

This invention relates to measuring devices, and more particularly to an automatic system and process for weighing trucks.

The Department of Transportation of many states limits the load (weight) that trucks can carry on its highways and roads to an amount substantially less than the maximum load-carrying capacity of the trucks, and/or limits the gross overall weight of trucks on their highways. State laws and regulations usually allow greater loads for larger size trucks with the precise allowable load being dependent on the overall length and/or number of axles of the truck. In an effort to enforce compliance of their laws and regulations, the states have set up road blocks and weighing stations along their highways and have regularly run checks and vehicle (truck) inspections outside of truck terminals and depots, such as outside of refineries. In a further effort to enforce their laws and regulations, as well as increase their revenues, many states have issued substantial fines against refineries, truck terminals, and depots for weight violations of trucks originating at that refinery, terminal, or depot.

In order to comply with state laws and regulations, most large and/or busy truck terminals, depots, and refineries are now weighing, measuring the length, and counting the axles of outgoing trucks and requiring the trucks to dump excess load, if they exceed state laws or regulations, before receiving a bill of lading. Reading truck scales, measuring truck lengths, counting axles, comparing the readings and measurements with state laws and regulations, and calculating the excess load have heretofore been done manually by gaugers. This is very tedious, time-consuming, and expensive and often requires many employees who are needed elsewhere in the refinery, terminal, or depot. It also often causes long waiting lines of trucks. These waiting lines can be very, very slow because of the amount of time needed to make the manual truck measurements and calculations. Now, truck drivers as a group can be very impatient, especially in hot weather, such as found in refineries in Georgia, Texas, etc. Time is also money to truck drivers, many of whom are independent distributors. Long waiting time creates morale problems and bad customer relations.

It is therefore desirable to provide an improved process and system which overcomes most, if not all, of the above problems.

SUMMARY OF THE INVENTION

A truck measuring system and process is provided to automatically, efficiently, and readily measure the load and length of trucks, such as at refineries, truck terminals, and depots, to assure compliance with state highway laws and regulations. Advantageously, the truck measuring system and process is speedy, reliable, and easy to use. It has improved relationships with customers, truck drivers, and law enforcement officials and has also saved on valuable labor costs and time.

To this end, the effective truck measuring system has sensors for sensing the length of a truck. In the preferred embodiment, the sensors take the form of photoelectric cells which optically detect the position, profile, and number of axles and/or outside tires of the truck. A scale is also provided to weigh the truck. A central processing unit, such as a microprocessor or computer, is operatively connected and coupled to the sensors and scale. The central processing unit determines the maximum allowable loaded weight of the truck under state highway laws and regulations based upon the optically sensed length and/or number of axles or outside tires of the truck. It then compares the maximum allowable loaded weight with the actual scale weight and automatically actuates a printer to print a bill of lading for the truck, if the actual scale weight is less than the maximum legal weight.

In the preferred form, a control signal or module is operatively connected to the central processing unit to indicate when the truck's weight and/or load is above or below legal limits. The system can also have a digital readout for displaying the measured weight and/or load of the truck and/or number of pounds that the truck is above or below the legal limit.

In the preferred process and system, trucks are driven to a platform where they are weighed and measured before receiving their load. After taking these measurements, the central processing unit can indicate to the truck driver the location (loading rack) where the truck can receive its load and the maximum legal load it can receive. At the loading site, a load of material, such as asphalt, is dispensed by a spout into the truck. The loading site can also be equipped with a scale and load indicator, if desired. For many types of materials, such as gasoline or oil, an automatic dispenser which is connected to and controlled by the central processing unit can be installed at the loading site to automatically dispense and meter a proper and legal load of material through an outlet nozzle into the truck.

The above process procedure is particularly efficient and provides reliable controls to comply with state regulations. The system can also be enhanced with anti-theft, safety and surplus avoidance controls, as well as supplemental chemical or additive injectors.

A more detailed explanation of the invention is provided in the following detailed description and appended claims taken in conjunction with the accompanying drawings.

BRIEF DESCRIPTION OF THE DRAWINGS

FIG. 1 is a schematic flow diagram of a truck measuring system and process in accordance with principles of the present invention;

DETAILED DESCRIPTION OF THE PREFERRED EMBODIMENT

Figure 1A:
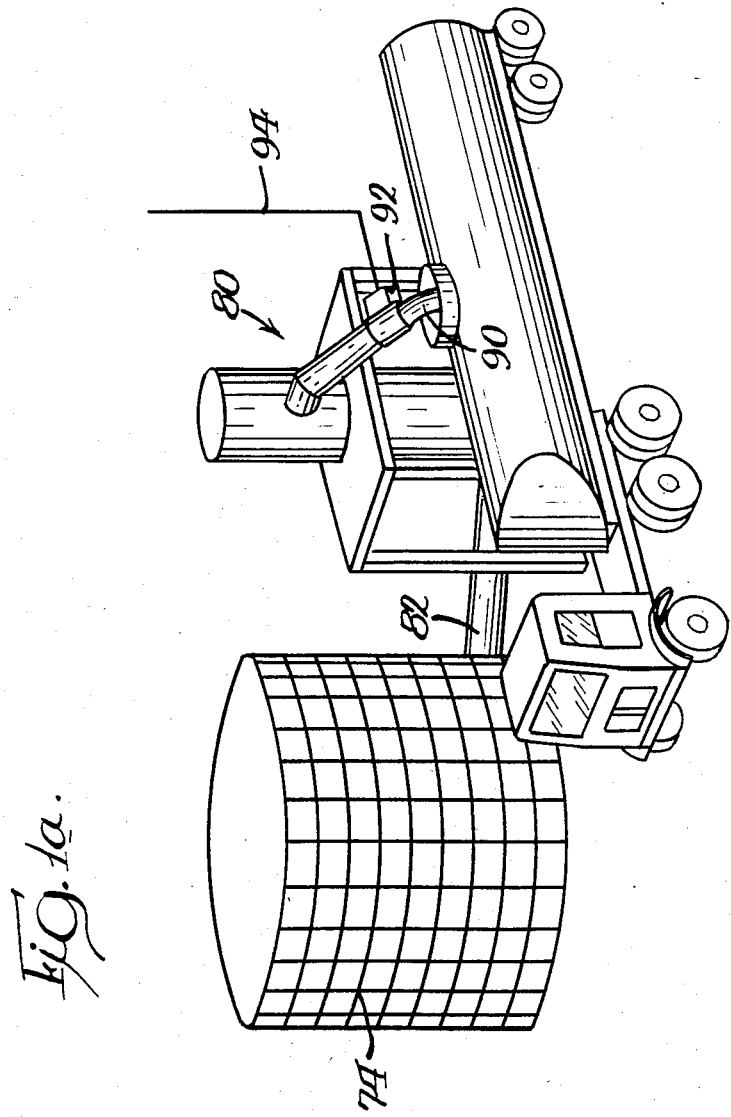
FIG. 1a is a perspective view of a load rack which automatically meters product into a truck.

The truck measuring system and process 10 of FIG. 1 automatically, efficiently, and readily measures the load (weight) and length of trucks, such as at refineries, truck terminals, and depots to assure compliance with state highway laws and regulations. The truck measuring system and process has a central processing unit such as a microprocessor or a computer 12 interconnected by wires 13 to one or more logic control boxes or panels 14, which is interconnected by wires 15 to an identification card/badge input reader and a magnetic or optical scanner 16 and by wires 17 to a printer 18 such as a laser printer, an inkjet printer, or an impact printer. The logic control box is interconnected by wires 19a to a truck-scale 19 which weighs the trucks, and by wires 20a to sensors 20 which sense the length of trucks.

The identification input reader and scanner 14 reads a yellow plastic identification carrier card or badge 21 of the truck driver and white plastic product identification card or badge 22 which the driver (truck driver) inserts into the input reader. The product identification card can either be a weigh-in product identification card or a weigh-out product identification card. The weigh-in product identification card indicates the type of product (material) that the driver wants loaded into his truck. The weigh-out product identification card indicates that the driver has loaded product into his truck. The identification carrier card indicates the name and company of the driver.

The input reader has a normally on red light 23 to indicate when the first identification card, such as the driver's identification card, should be inserted into the input reader, a yellow light 24 to indicate when the second identification card, such as the product identification card, should be inserted into the input reader, and a green light 25 to indicate that the second identification card has been read. The truck can then proceed to the loading rack upon receiving the loading ticket from the printer.

The scale is mounted along a reinforced concrete base or floor 26 of the main body of a truck-supporting platform 28. The scale and platform should be of a sufficient size and strength to support different size trucks and loads. Both ends of the platform have an inclined concrete ramp or apron 30 and 32 which provides access or entrance and exit ramps for entering and leaving the platform. Positioned within the interior of each ramp is an oscillating vehicle detector loop 34 or 36 which is interconnected by wires 38 and 40 to the central processing unit. The loops detect the presence of a vehicle. To this end, the loops emit oscillations or an electromagnetic field. When a vehicle enters the ramp, the massive amount of metal in the vehicle interferes or blocks the oscillations or field and trips, triggers, and activates an alarm horn or bell 41 as well as the scale and signal light indicators.

Figure 2:
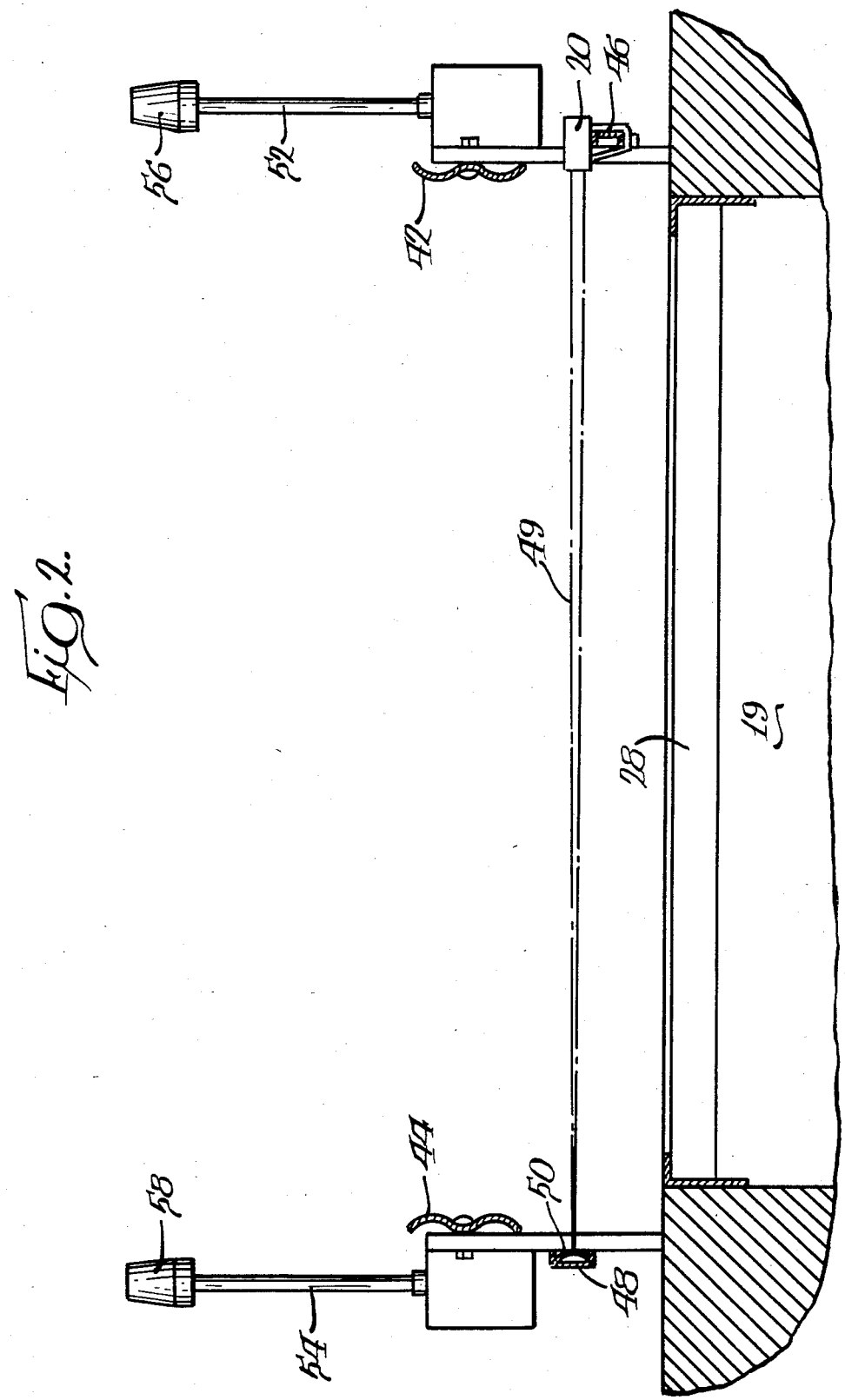
FIG. 2 is cross-sectional view of the truck platform.

Extending upwardly from the elongated sides of the platform are bumper guard rails 42 and 44 which protect the sensors by preventing the trucks from moving laterally off the scale and colliding with (striking) the sensors. The sensors are mounted on support rails 46 and 48, which are positioned laterally outwardly of the bumper guard rails. The sensors are positioned at relatively close intervals along the rails and at a sufficient height to sense and detect the number of axles and/or outside tires of the trucks. The sensors on rail 46 are preferably photoelectric cells (photoelectric sensors) which emit and receive infrared signals or other light beams 49 (FIG. 2) which are bounced off and reflected by retroreflectors 50 on rail 48. The retroreflectors are positioned across from and laterally aligned with the photoelectric cells. When the truck's tires or axles are positioned across from a sensor, the signal or beam emitted from that photoelectric cell is blocked, which activates and trips that sensor's circuit and transmits a signal to the central processing unit.

At each end of the platform is a pole 52 or 54 with a light indicating signal 56 or 58 thereon. The signals can be connected by wires 60 to the central processing unit. The signals display a red light to the truck driver when the truck is to stop on the platform and optionally when the gross overall weight of the truck exceeds state highway laws and regulations.

A digital readout 62 is interconnected by wires 64 to the scale and the central processing unit. The digital readout is positioned to be readily read and displayed to the truck driver. The digital readout displays the gross overall weight of the truck in pounds as measured by the scale.

Desirably, the central processing unit also includes safety equipment, such as optical isolators 66 and circuit breakers 68 which interface with, electrically isolate, and protect the computer, scale, and sensors. A power supply 70 and inverter 72 or transformer converts 120 volts AC to 24 volts DC to power portions of the system.

Each of the tanks 74 holding product to be dispensed and loaded into the trucks, can be connected to monitoring equipment 76, such as thermometers (temperature probes), pressure gauges, meters, etc., which measure and determine the temperature, pressure, specific gravity, etc. of the products in each tank. The monitoring equipment can be connected by wires 78 to the central processing unit and can feed the information monitored to the central processing unit.

A loading rack 80 is connected by one or more pipes 82 to each tank. The loading rack has a spout 84 for dispensing a product, such as asphalt, into the dome or inlet of a truck. The loading rack can have an optional loading rack-scale 86 and/or loading rack-indicating meter 88 to indicate the weight of the truck and/or weight or gallons of product being dispensed into the truck during loading.

As shown in FIG. 1a, for less viscous products, such as gasoline or oil, the loading rack can be optionally equipped with a nozzle 90 and automatic metering equipment 92 connected by wires 94 to the central processing unit to automatically control, regulate, and dispense the product into the truck in amounts equal to or slightly less than the maximum allowable net load as determined and regulated by the central processing unit.

The logic control box, which is also referred to as the logic control board or panel, which can include the central processing unit is wired and programmed to determine (calculate) the overall length and/or wheelbase length between the front and rear axles of each truck as well as detect the number of axles and/or outside tires of each truck in response to the number and location of the tripped sensors (blocked photoelectric cells). The logic control box is also wired and programmed to determine the maximum allowable gross weight (legal weight) of each truck depending on the sensed overall length or wheelbase length of the truck and/or its number of axles or outside tires according to state highway laws and regulations which are preprogrammed into the central processing unit. The logic control box is further wired and programmed to compare the truck's actual measured scale weight as detected by the truck-scale with the maximum allowable legal weight. If the truck's actual weight is less than the legal limit (maximum allowable weight), then the central processing unit activates the printer. The logic control box can also be wired and programmed, if desired, to activate the red indicating light and/or an audible alarm, such as a horn or bell, if the truck's actual weight exceeds the legal limit, as well as to indicate on the digital readout (scale readout) the numbers of pounds overweight.

The logic control box will instruct (actuate) the printer to print a loading ticket when the truck has not yet received its load of material. The loading ticket can identify the name(s) of the driver and customer from the identification badge input reader and scanner as well as the time, date, product name (type), the location (site) of the tank or loading rack (dispenser) where the product can be dispensed into the truck, the tare (unloaded/empty) weight of the truck, and the maximum allowable number of pounds and gallons of product (load) that can be dispensed (injected) into the truck without exceeding the legal limit. The logic control box will instruct (actuate) the printer to print a bill of lading when the truck has already received its load and loading ticket. The bill of lading can identify the time and date of weigh-in and weigh-out, name(s) of the driver and customer, the gross overall weight and tare weight of the truck, the product name (type), the specific or API gravity and temperature of the product, the number of gallons and weight (pounds) per gallon of product and the total number of pounds (net weight) of the product. The bill of lading can also indicate the number of axles and/or length of the truck and the truck's maximum allowable legal weight. The bill of lading further indicates that the vehicle's gross weight has been computer certified in accordance with state law. This information is stored and fed by the central processing unit to accounting personnel for billing purposes. The central processing unit can also be equipped with a program for automatic computerized billing.

Figure 3:
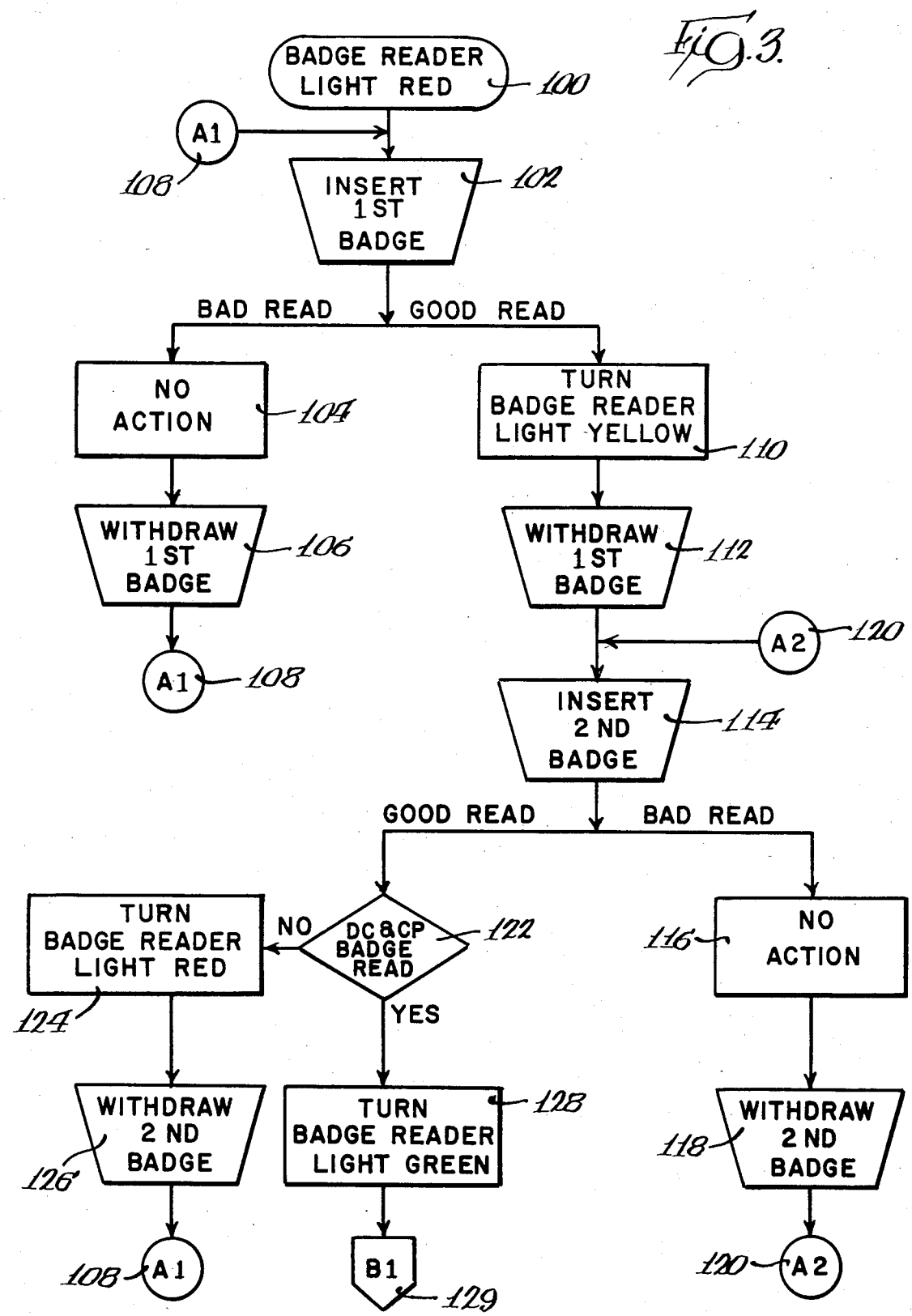
FIGS. 3–5 are schematic control/logic flow diagrams of the identification badge reading and weighing operations.

While the logic control box and central processing unit can be wired and programmed in many ways to attain the above results and sequence of events, one preferred logic control system is shown in the flow diagrams and source codes of FIGS. 3–11. As shown in FIG. 3, the badge reader red light control 100 actuates the red indicator light of the identification card input reader when the input reader is waiting to receive the first identification card, such as the driver/customer identification card or badge.

When the driver inserts his first identification card into the input reader, the driver identification card reader and verifier 102 accepts, reads, and verifies the first identification card. If the card is not accepted or verified, no action is taken at idling step 104 and the card is withdrawn at step 106 and reinserted at step 108 into the input reader. When the first identification card is accepted, the yellow light badge reader control 110 activates the yellow indicator light of the input reader to indicate that the input reader is ready to receive the second identification card, such as the product identification card or badge, after withdrawing the first identification card at step 112.

When the driver inserts the second identification card into the input reader, the second identification card reader and verifier 114 (FIG. 3) accepts, reads, and verifies the second identification card. If the second identification card is not accepted, no action is taken at idling step 116 and the second identification card is withdrawn at step 118 and reinserted at step 120. When the second identification card is verified, a driver carrier and product identification card-comparer and verifier 122 verifies that the driver/customer is authorized to receive the product. If no authorization or verification occurs, a red light actuator 124 actuates the red indicating light of the input reader requiring the second identification card to be withdrawn at step 126 and the driver to reinsert correct identification and product cards into the input reader at step 108. When both cards are verified, a green light badge reader control 128 activates the green indicator light of the input reader to indicate that both cards have been verified.

Figure 4:
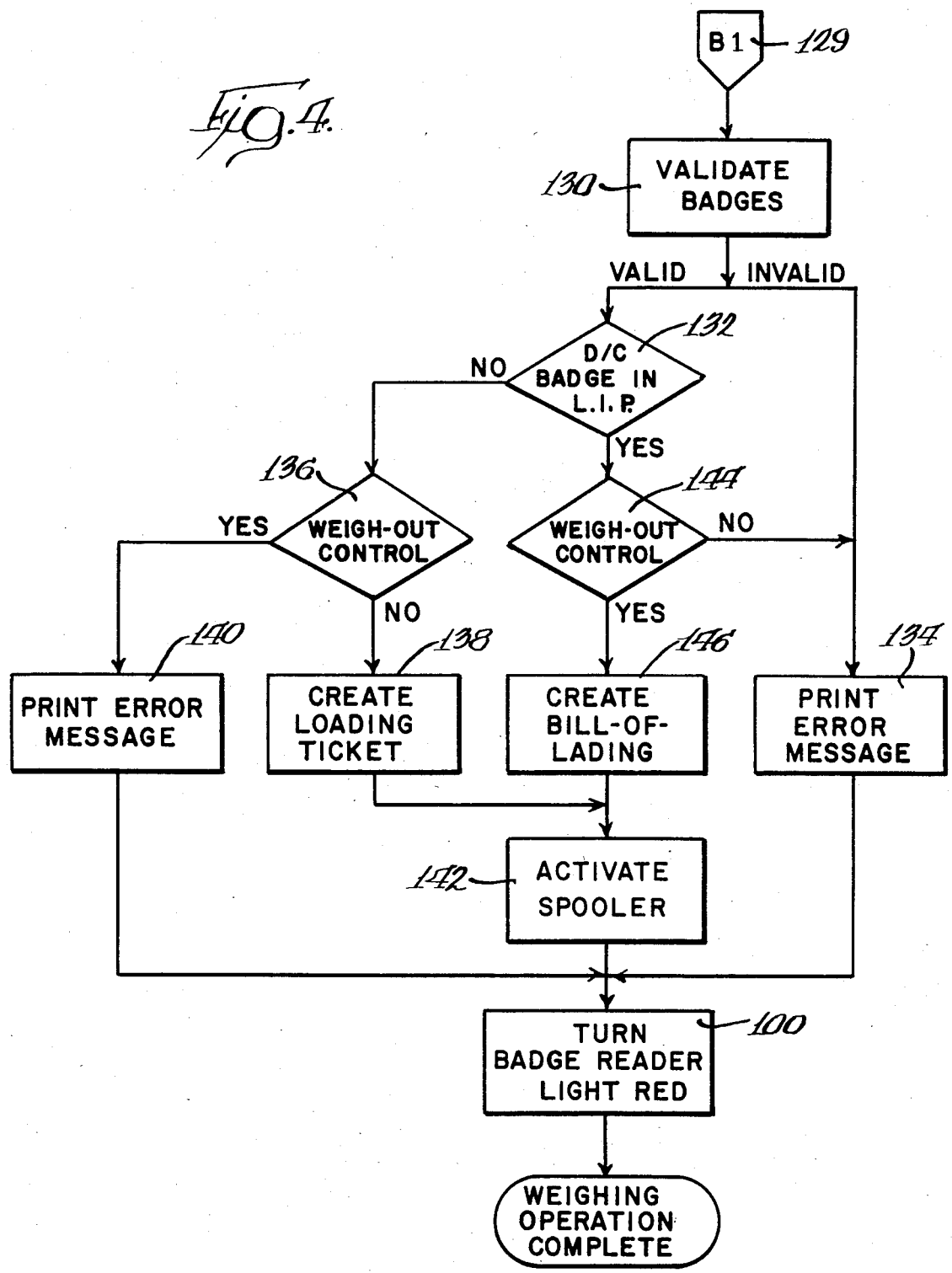

The process continues at step 129 and a loading ticket or bill of lading is obtained in accordance with loading ticket/bill of lading control operations of FIG. 4. After the green indicating light of the input reader has been actuated as described above, the validating control 130 feeds the driver and product information from the driver and product identification cards to a load-in-progress control 132, unless an error occurs, in which case, an error message actuator 134 will trigger and indicate an error message on the printer to the driver. If an error occurs, the driver must reinsert correct driver and product identification cards into the input reader or seek assistance from employees at the truck loading facility.

The load-in-progress control determines if the driver has reached this step the first or second time by determining if the information contained in the driver/carrier identification card is contained in a load-in-progress file. At the first time when the driver/carrier information is not contained in the load-in-progress file, the driver has not yet loaded his truck and a weigh-out control 136 determines if the product card (badge) of the driver is a weigh-in product card or a weigh-out product card. If the product card is a weigh-out product card, such as a weigh-out product card having an identification code number of 9500, then a print error message control 140 will trigger and indicate an error message on the printer to the driver requiring the driver to reinsert correct driver and product identification cards into the input reader or seek assistance from employees at the truck loading facility. If the weigh-out control 136 scans a proper weigh-in product card, then a loading ticket activator, also referred to as a scale-output tare load data dispatcher 138, is activated. The scale-output tare load data dispatcher retrieves, processes, and stores the tare (unloaded/empty) measured weight of the truck as determined by the scale, the optically sensed length, number of axles and/or outside tires, and the maximum legal weight determined by the maximum legal weight determining operations. If no error is detected by the operations of FIG. 5 (discussed below), the scale-output tare load data dispatcher also sets up a load-in-progress record and log file to store that information and sends that information to a spooler 142. The scale-output tare load data dispatcher transmits that information to a disc or data bank operatively associated with the spooler which activates the printer to print a loading ticket with the required information. If an error is detected by the dispatcher 138, then the spooler transmits an error message to the printer for printing.

Figure 5:
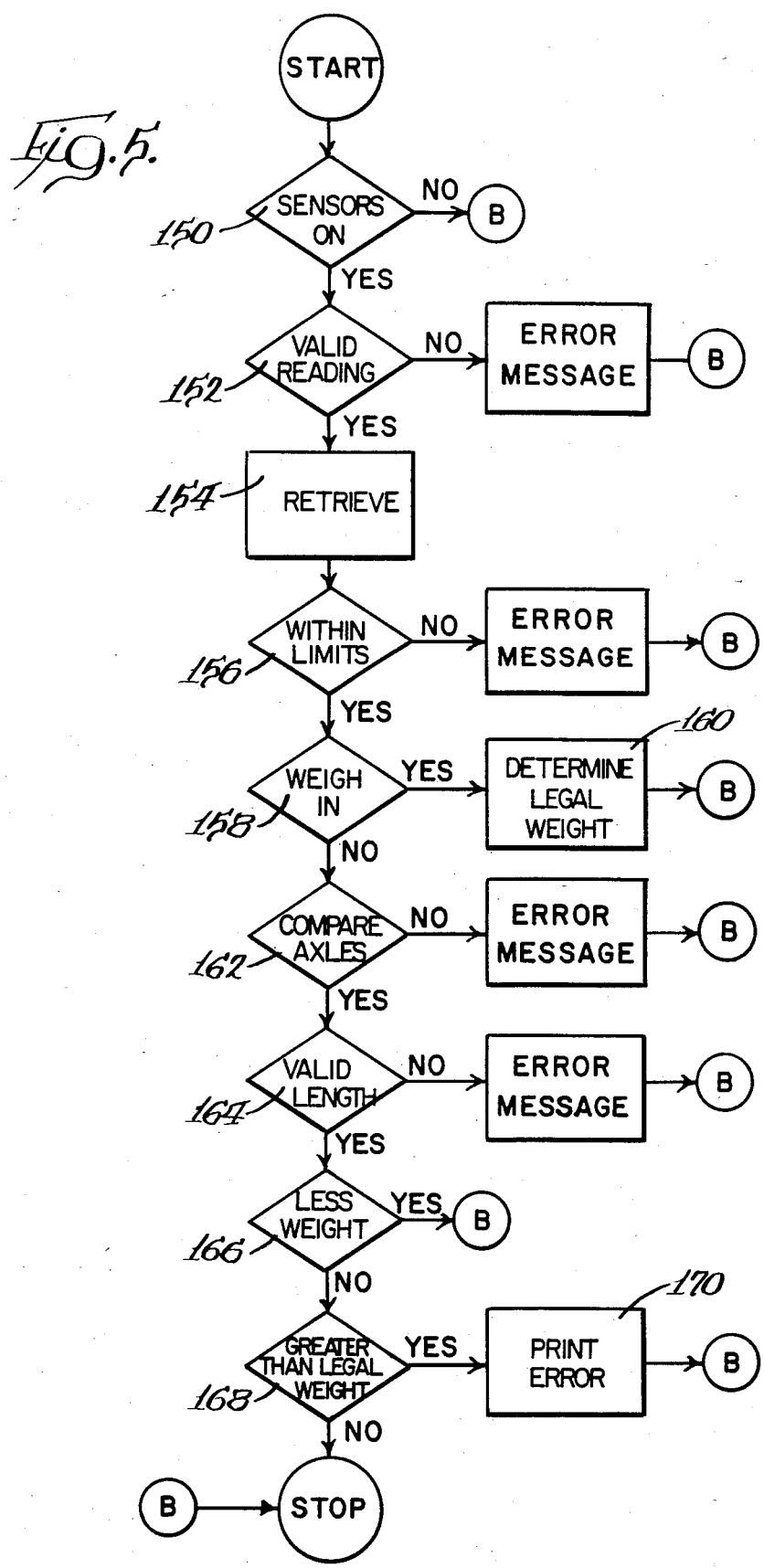

If the load-in-progress control 132 (FIG. 4) determines and verifies that the driver has reached that step a second time because it electronically locates a load-in-progress file containing the driver identification found in his driver/carrier identification card (badge), then the driver has loaded his truck and commenced weigh-out operations. A weigh-out control 144 scans the product identification card to determine if it is a weigh-in product identification card or a weigh-out product identification card. If a weigh-in identification card is sensed, a print error control (printer message actuator) 134 will trigger and indicate an error message on the printer to the driver requiring the driver to reinsert correct driver and product identification cards into the input reader or seek assistance from employees at the truck loading facility. If a weigh-out product identification card is sensed by the weigh-out control 144, such as a weigh-out product identification card having the code number 9500, then a bill of lading-activator 146, also referred to as a scale-output gross load data dispatcher, is activated. The scale-output gross load data dispatcher retrieves the measured gross overall loaded weight from the scale, the truck's length and number of axles and/or outside tires as optically sensed by the sensors, the maximum allowable legal weight determined by the maximum legal weight determining operations, and compares the measured gross weight of the truck with its maximum allowable legal weight as more fully described in the process flow diagram of FIG. 5 discussed below. The scale-output gross load data dispatcher verifies that the truck driver is using the same truck for both weigh-in and weigh-out and makes sure that the truck's gross weight is below the legal limit or otherwise indicates an error message. The scale-output gross load data dispatcher 146 reads the existing load-in-progress record, accumulates the above information, and sets up a log file to store that information. It also interfaces with financial system accounting controls for recording a record of that transaction and updates the records pertaining to the customer. The scale-output gross load data dispatcher transmits the loading ticket information to a disc or data bank operatively associated with the spooler 142 which activates the printer to print the bill of lading with the required bill-of-lading information unless an error is indicated by the operations of FIG. 5 (discussed below) in which case the dispatcher 146 transmits an error message to the printer via the spooler for printing. The cycle is then complete and the red light control 100 is actuated to restart the cycle.

The maximum allowable weight is determined and compared with the measured gross weight of the truck in accordance with the operations and steps shown in FIG. 5. The operations and steps of FIG. 5 are subroutines of steps 138 and 146 of FIG. 4. As shown in FIG. 5, a truck length measurement control module 150 determines if the optical photoelectric sensors are operating on line. If not, then the measured gross weight can be considered to be within the maximum allowable weight and the subroutine is ended. If yes, then control module 152 determines if the sensors are indicating a proper and valid reading as determined by the operations of FIG. 6 (discussed below). If not, then an error message is indicated. If yes, then a retriever 154 retrieves the length and the number of axles and/or outside tires (wheels) of the truck as determined by the operations of FIG. 6 (discussed below). Limit control 156 determines if the truck's length, axles, and number of outside tires come within preselected limits, such as determined by the Department of Transportation regulations, refinery standards, scale capacity, etc. If not, then an error message is indicated. If yes, then a weigh-in control module 158 determines if the truck is weighing in. If affirmative, then a legal weight determining module 160 compares the truck's length, number of axles, and outside tires with preloaded data records and/or tables based upon the Department of Transportation regulations and determines and selects the appropriate maximum allowable weight (legal limit) from the data table. If the truck is weighing out, then a validation comparer 162 compares the number of axles of the truck during weigh-out to the number of axles of the truck during weigh-in to assure that the truck driver is driving the same truck during weigh-out as during weigh-in. If not, then an error message is indicated. If yes, then a length validating comparer 164 compares the sensed length of the truck during weigh-in to the length of the truck during weigh-out to further validate that the driver is driving the same truck during weigh-out as he drove during weigh-in. If not, then an error message is indicated. If yes, then a receipt notice control module 166 determines whether the truck is delivering load to the refinery or picking up load. If the truck weighs less during weigh-out than during weigh-in, then the truck is delivering goods to the refinery, and a bill of lading will not be issued by the automatic measuring system. If the truck weighs more during weigh-out than during weigh-in, then a legal weight comparer 168 determines if the actual overall gross weight of the truck as measured by the scale is greater than the maximum allowable weight (legal limit). If yes, then a print error indicator 170 actuates the printer to indicate an error message requiring the driver to dump his excess load and restart weigh-out operations. If no, then the bill of lading actuator 146 (FIG. 4) transmits the bill of lading information to the spooler 142 which in turn stores that information and activates the printer to print the bill of lading.

Figure 6:
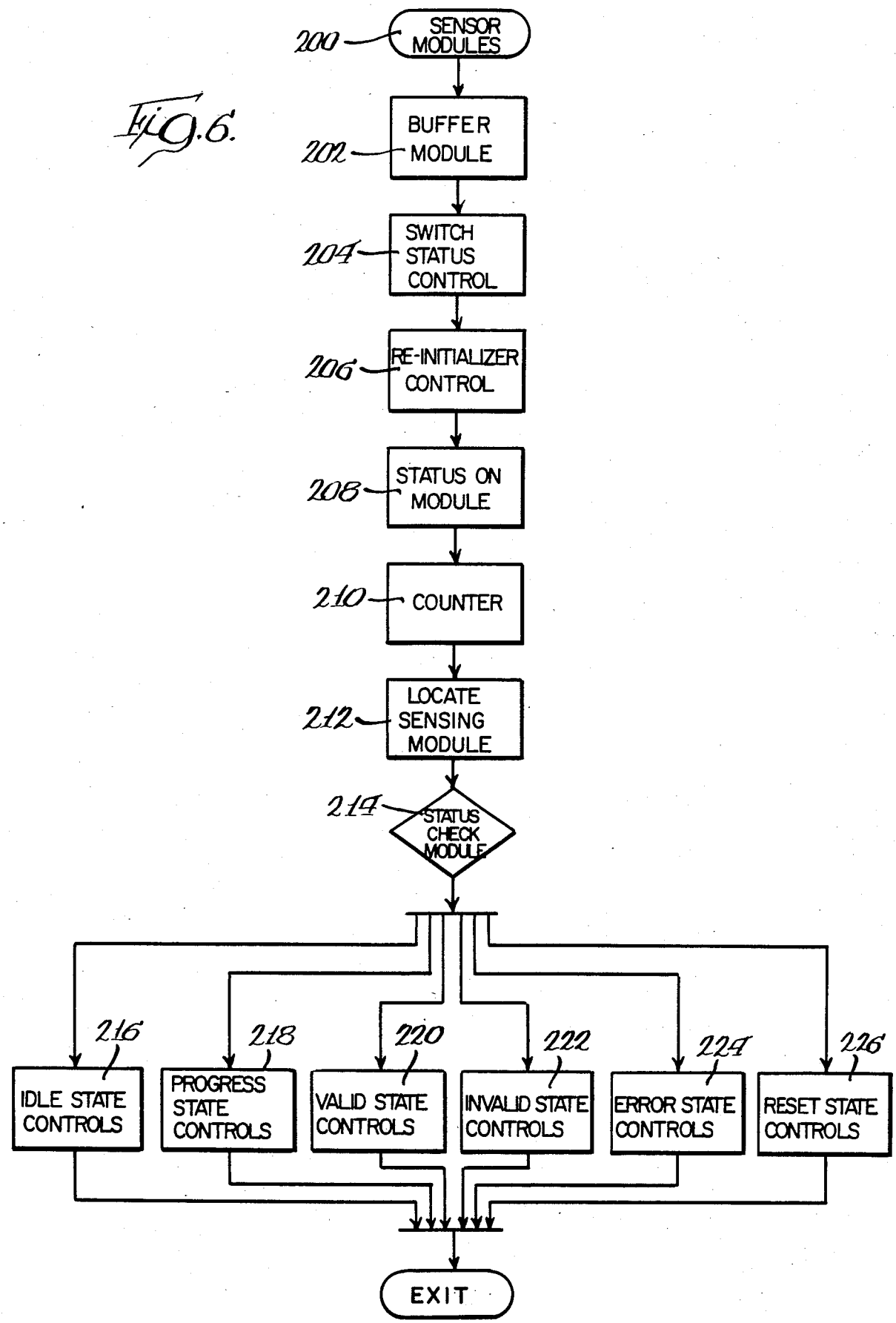
FIGS. 6–11 are schematic control/logic flow diagrams of the axle/tire sensing and length determining operations.

The length and axle count measuring, determining, and sensing operations and routines of the photoelectric sensors in cooperation with the central processing unit and logic control box, are shown in FIGS. 6–11. As shown in FIG. 6, the photoelectric sensor modules 200 are activated each time a photosensor (photoelectric sensor unit) changes state from unobstructed (off) to obstructed (on). A buffer module 202 unloads the data sensor (switch) buffer, adjusts the buffer pointers, and clears the buffer slots to zeros. Switch status initialization control 204 then sets the initial status of all sensors (switches) to off. The reinitializer control 206 reinitializes, retrieves and saves the wheel describing data tables and other data storage areas for the ongoing sensing operation. Status on module 208 converts all the on bits from the switch data buffer into on status for the switches/sensors. Counter 210 counts the number of switches/sensors that are on. Locate sensing module 212 then locates the front forwardmost sensor/switch that is on, which is designated as the highwater mark, and the back rearwardmost sensor/switch that is on, which is designated as the lowwater mark. Status check module 214 then determines the status or state of the measurement area as set by the previous iteration of the photoelectric sensor modules 200 and directs processing control to the corresponding state processor, and when complete, returns and exits to a service program. The initial state before any iteration is also referred to as the idle state. Every time a photoelectric sensor (switch) is blocked by a newly sighted (sensed) tire, axle, or other object, the cycle is repeated.

The idle state controls 216 are triggered when previously no photoelectric cells (sensors) were blocked, and determines whether the current state is to remain the idle state or is to become the reset state which occurs when the first photoelectric cell is blocked in response to the truck first entering into the measurement area.

The measurement in progress state controls 218 continually count the number of wheels (tires) that are moving or stopped on the platform and scale. They also measure the chordal width of the tires at the height of the sensors as well as the length of the truck's wheelbase between the front and rear axle. The measurement valid state controls 220 determine if the offscale detectors (vehicle detector loops contained in the access ramps) are activated after the measurements have been completed and, if so, set the measurement invalidated state. The measurement invalidated state controls 222 determine if the current state is to remain in the measurement invalidated state, or is to become the idle state or the reset state. The error state control modules 224 determine whether the current state is to remain the error state, or is to become the idle state or the reset state. The reset state controls 226 determine whether the current state is: (1) to remain the reset state, (2) to become the idle state, (3) to become the measurement in progress state, or (4) to become the error state. The measurement in progress state occurs when the second photoelectric cell (sensor) is blocked in response to the truck continuing to enter the measurement area. In this case, processing is continued by transferring to the measurement in progress state controls. The error state occurs if there is an invalid sequence of switch closures.

Figure 7:
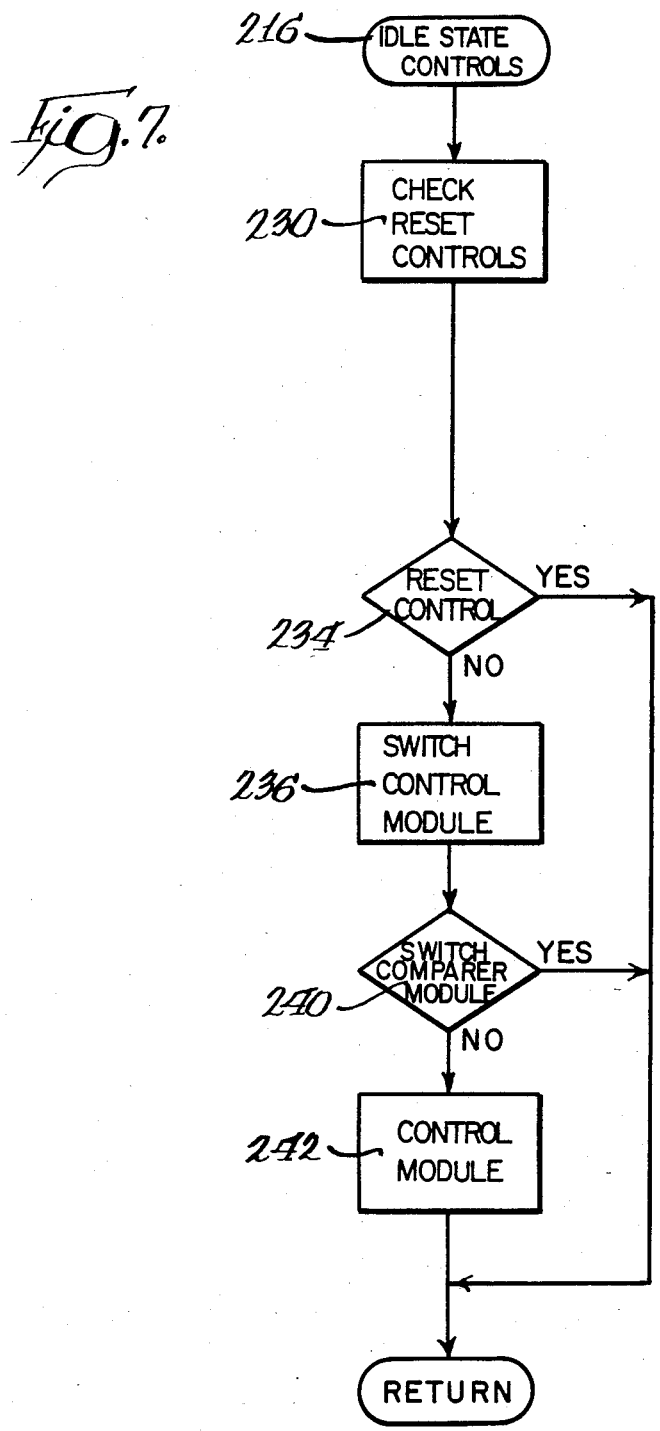

As shown in FIG. 7, the idle state controls 216 include the check-reset controls 230 (described below), which set the reset state or idle state if appropriate. Reset control module 234 determines if the reset state has been set. If yes, then the routine is ended to await its next cycle. If not, then the switch control 236 determines the total number of on switches/sensors. Switch comparer 240 then determines if the number of on sensors/switches is zero. If yes, then the routine is ended to await its next cycle. If no, then control module 242 sets the current state to the error state.

Figure 8:
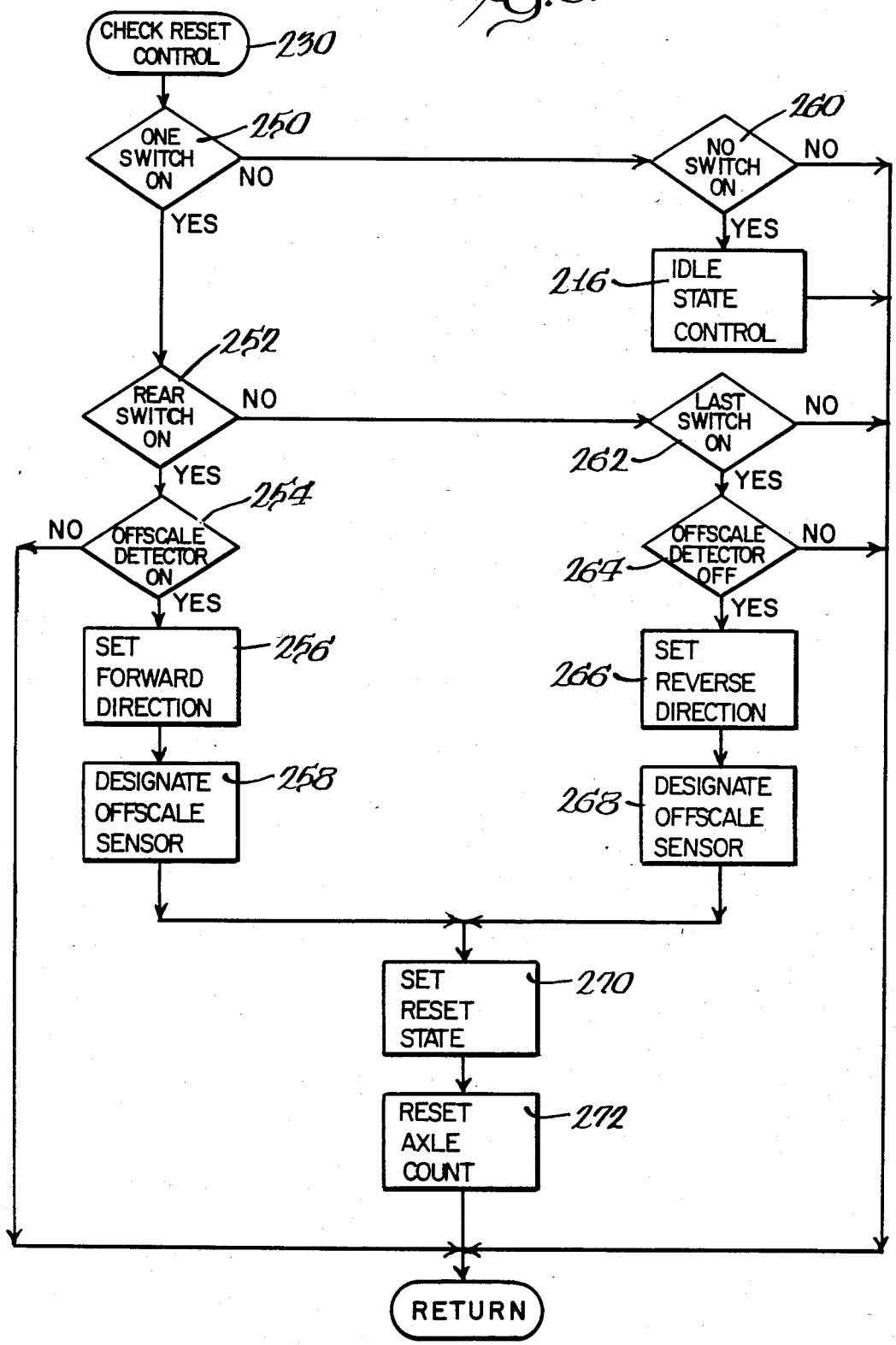

As shown in FIG. 8, the check-reset controls 230 include a switch determining module 250 that determines whether exactly one photoelectric sensor/switch is on. If yes, then the front/rear sensor module 252 determines whether the rear sensor/switch at the rear end (entrance) of the platform is on. If yes, then the control module 254 determines if the offscale detector or vehicle detector loop on the ramp opposite the first switch is off, and if no, then the routine is ended. If yes, then module 256 sets the forward direction, designates the first switch at the beginning of the platform as the beginning sensor/switch, and designates the last sensor/switch at the end of the platform as the ending switch. Module 258 then designates the offscale sensor at the end of the platform end (ramp) as the offscale error detecting switch and designates a sensor near the last sensor/switch as the front trigger switch. If switch module 250 determines that there is not exactly one switch/sensor on, then zero switch determining module 260 determines if there are no photoelectric sensor/switches on. If any are on, then the routine is ended. If none are on, the set idle state controls 216 set the current state to the idle state and the routine is ended. If the front/rear sensor module 252 determines that the first switch is not on, then the last switch module 262 determines whether the last sensor/switch is on. If not, then the routine is ended to await its next cycle. If yes, then the opposite offscale detector module 264 determines whether the offscale detector or vehicle detector loop on the ramp opposite the last sensor/switch is off, and if no, then the routine is ended. If yes, then module 266 sets the reverse direction, designates the last switch at the end of the platform as the beginning sensor/switch and designates the first switch at the beginning of the platform as the ending switch. Module 268 then designates the offscale sensor at the beginning of the platform (entrance ramp) as the offscale error detecting switch and designates a sensor near the first sensor/switch as the front trigger switch. Control module 270 sets the reset state as well as sets the application reporting code to show reset and resets the rear trigger indicator. Module 272 resets the axle count to zero, locates (points to) the first wheel data table, and sets the operations of the sub-state to wheel-reset. The check-reset controls are then complete until the next cycle.

Figure 9:
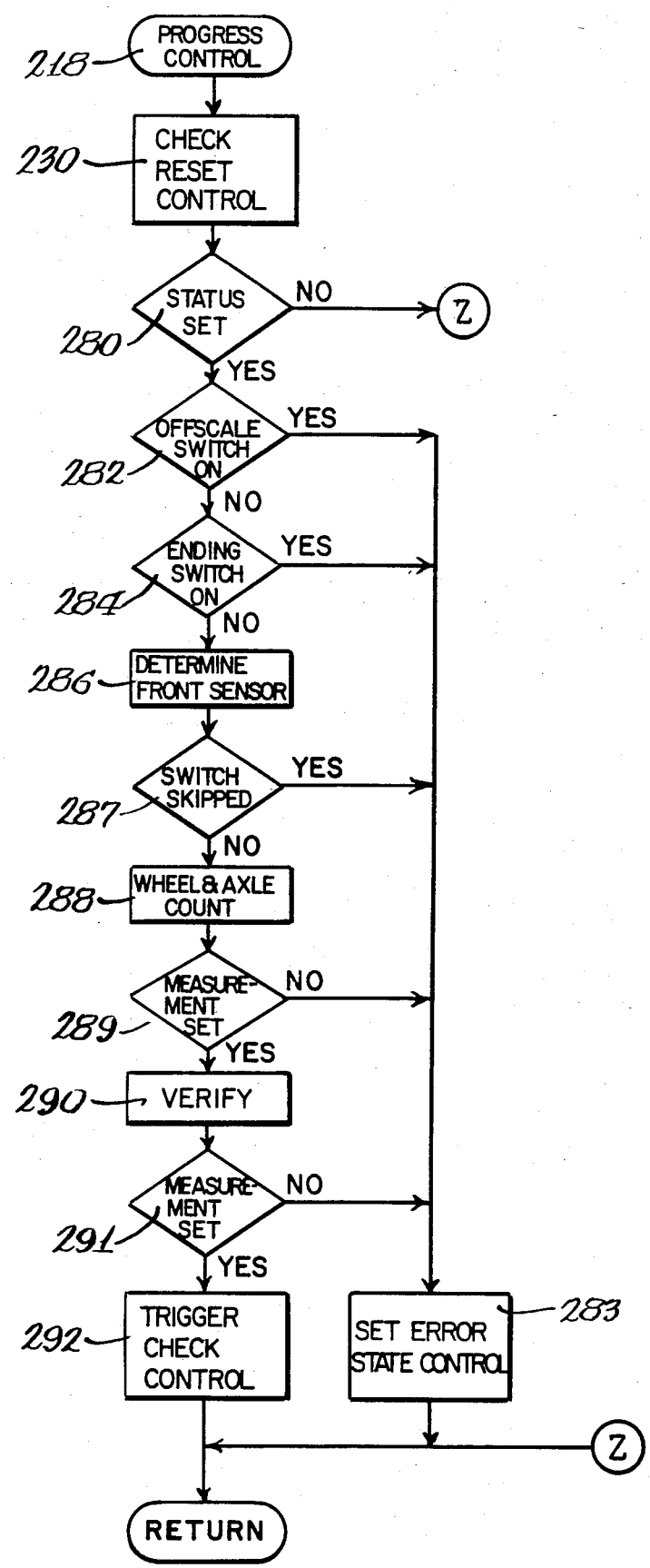

As shown in FIG. 9, the measurement in progress controls 218 include check-reset controls 230. Status control module 280 determines whether the measurement in progress state controls are still set. If not, then the routine is ended until the next cycle. If yes, then module 282 determines whether the offscale error detecting switch is on. If yes, then the set error state controls 283 are activated and this sets the current state to the error state and the routine is ended. If not, then the module 284 determines if the ending switch is on. If yes, then the error state controls 283 are activated and the routine is ended until the next cycle. If not, then selector module 286 determines the frontmost on sensor or highwater mark switch. Skipped switch module 287 determines if a switch has been skipped by comparing the current highwater mark with the previous highwater mark. If yes, then the set error state controls 283 are activated and the routine is ended. If no, then the wheel-counting controls 288 (described below) count the wheels and axles of the truck and measure the chordal width (footprint) of each wheel as the truck drives upon the scale. Control 289 determines if the measurement in progress state controls are still set. If not, then the set error state controls 283 are activated and the routine is ended until the next cycle. If yes, then verification control module 290 verifies: (1) that the number of axles of the truck positioned on the scale at any time equals the number of axles counted crossing the scale entrance, and (2) that the footprint of each wheel on the scale does not exceed a preselected inputted valid maximum width. If the verification control module 290 detects an error then the error state is set. Module 291 determines if the measurement in progress state controls are still set. If not, then the set error state controls 283 are activated and the routine is ended until the next cycle. If yes, then the trigger check controls 292 (described below) are activated to determine the length and number of axles or outside tires of the truck. The routine is then ended until the next cycle.

Figure 10:
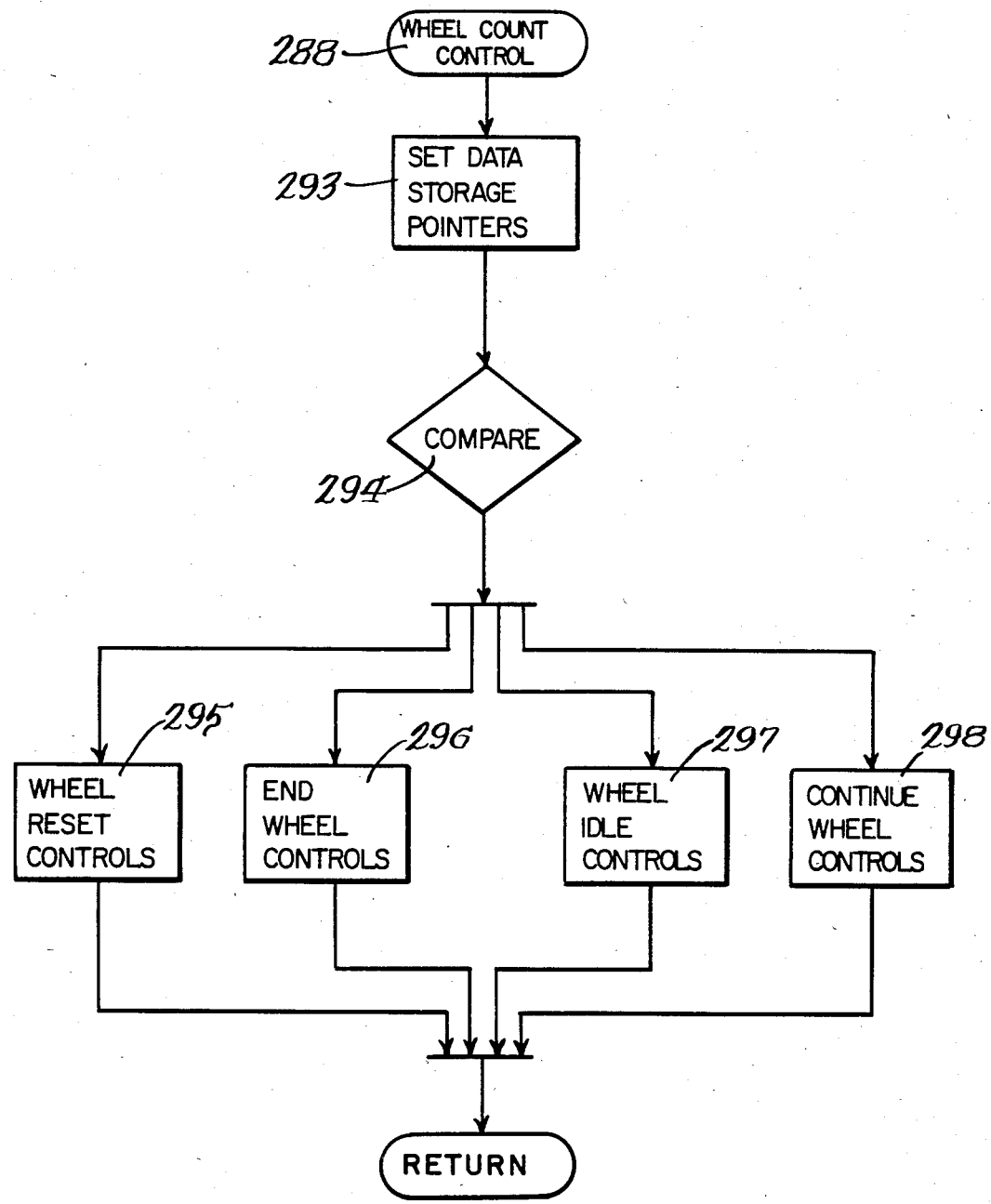

As shown in FIG. 10, the wheel counting controls 288 count the number of outside wheels (tires)/axles of the truck. Module 293 sets up data storage area pointers to correspond to the beginning sensor/switch and to the next adjacent switch. Comparer 294 determines what is the sub-state by determining which sub-state has most recently been set. Comparer 294 then: (1) activates the wheel-reset sub-state controls 295 if the wheel-reset sub-state is set, (2) activates the end-wheel sub-state controls 296 if the end-wheel sub-state is set, (3) activates the wheel-idle sub-state controls 297 if the wheel-idle sub-state is set, or (4) activates the continue-wheel sub-state controls 298 if the continue-wheel sub-state is set.

Wheel-reset sub-state controls 295 when activated: (1) set the wheel-idle sub-state if both the beginning and next adjacent switches are off, (2) set the end-wheel sub-state if the beginning switch is off and the next adjacent switch is on, (3) set the wheel-continue sub-state if both the beginning and next adjacent switches are on, or (4) retain the wheel-reset sub-state in all other situations. If the wheel-reset sub-state controls 295 set the wheel-continue sub-state, then these controls proceed by activating the continue-wheel sub-state controls 298 (described below).

End-wheel sub-state controls 296 when activated: (1) set the wheel-idle sub-state if both the beginning and next adjacent switches are off, (2) set the wheel-reset sub-state if the beginning switch is on and the next adjacent switch is off, (3) set the wheel-continue sub-state if both the beginning and next adjacent switches are on, or (4) retain the end-wheel sub-state in all other situations. If the end-wheel sub-state controls 296 set the wheel-continue sub-state, then these controls also decrement the axle count by one if the object at the beginning sensor is determined to be wide enough to be a wheel, since the truck may be backing off the scale.

Wheel-idle sub-state controls 297 when activated: (1) set the wheel-reset sub-state if the beginning switch is on and the next adjacent switch is off, (2) set the error state if both the beginning and next adjacent switches are on, (3) set the end-wheel sub-state if the beginning switch is off and the next adjacent switch is on and the axle count is not zero, (4) set the error state if the beginning switch is off and the next adjacent switch is on and the axle count is zero, or (5) retain the wheel-idle sub-state in all other situations.

Continue-wheel sub-state controls 298 when activated: (1) set the wheel-reset sub-state if the beginning switch is on and the next adjacent switch is off, (2) set the end-wheel sub-state if both the beginning switch and next adjacent switches are off, or (3) retain the continue-wheel sub-state in all other situations. If the continue-wheel sub-state controls 298 set the end-wheel sub-state, then these controls also determine the footprint of the object that has just entered and is now completely on the scale, and then: (1) if the footprint exceeds a preselected inputted valid maximum width, then the error state is set, (2) if the footprint is less than a preselected inputted valid maximum width, then the object is not counted as a wheel or axle, or (3) in all other situations the axle count (wheel-count) is incremented by one and the next wheel describing table is set up. Continue-wheel sub-state controls 298 also determine whether the axle count exceeds a preselected input valid maximum value, and if so, then they set the error state.

Upon completion of the operation of any of the substate controls as described above, the wheel counting controls routine is then ended until the next cycle.

Figure 11:
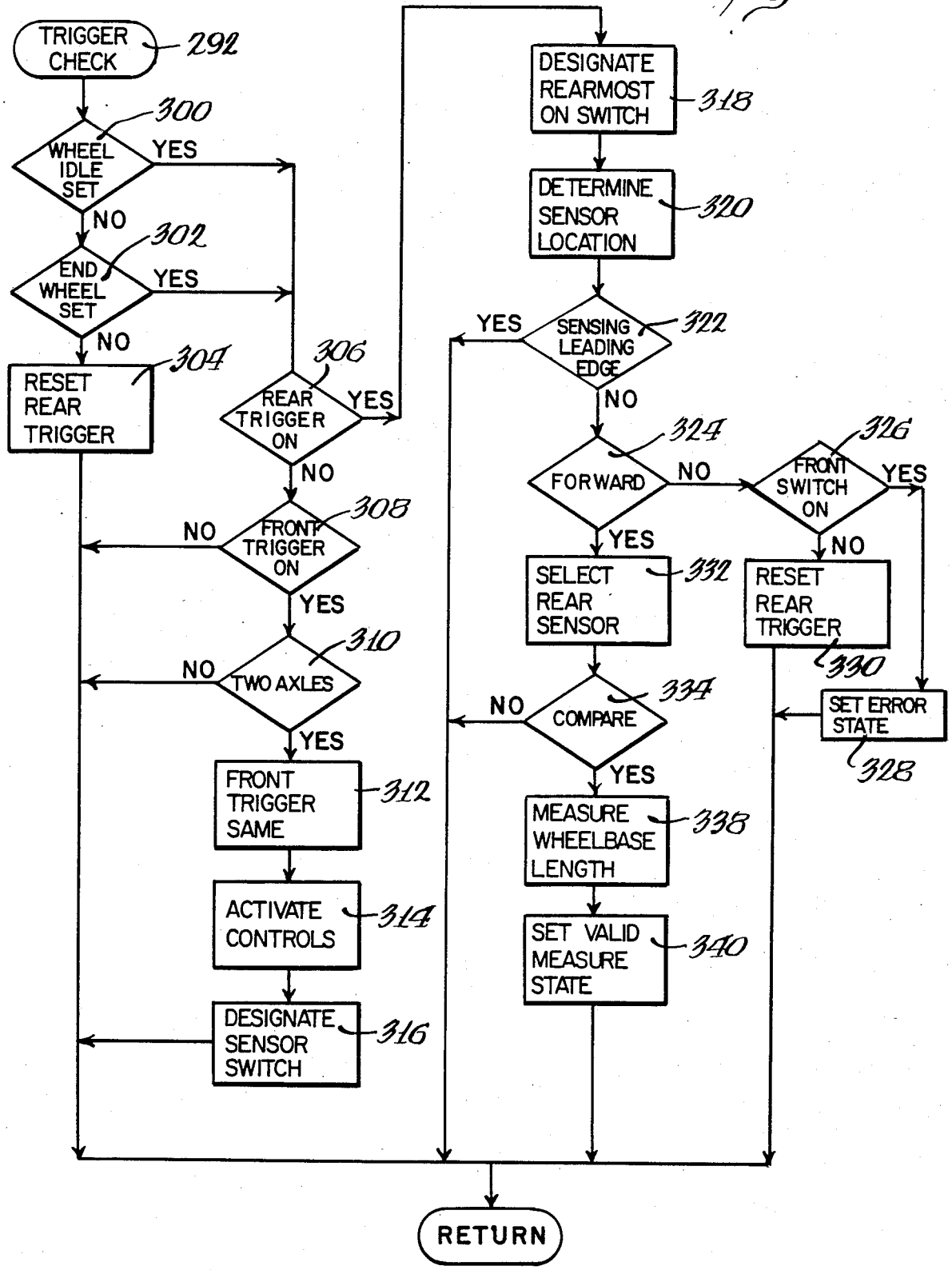

As shown in FIG. 11, the trigger check controls 292 include a check wheel-idle control 300 which determines whether the wheel-idle sub-state controls have been set. If not, then control module 302 determines if the end-wheel sub-state controls have been set. If not, then the truck is still entering upon the scale and module 304 will reset the rear trigger indicator to off and the routine is ended. If the check wheel-idle control 300 determines that the wheel-idle sub-state controls have been set, then the check rear trigger control module 306 is activated. If the control module 302 determines that the end-wheel sub-state controls 302 have been set then the check rear trigger control module 306 is activated. Check rear trigger control module 306, when activated, determines whether the rear trigger indicator is on. If not, then the check front trigger control module 308 determines whether the front trigger switch is on, that is, whether the front trigger switch (sensor) is blocked. If not, then the routine is ended. If yes, then the axle counter 310 determines whether at least two axles have been counted. If not, then the current state is set to the error state and the routine is ended. If yes, then control 312 determines the rearmost on sensor/switch. The control 312 also determines if the front trigger switch is the same as the current highwater mark switch. If yes, then controls 314 are actuated. If not, then control 312 determines if the forwardmost on switch is beyond the front trigger switch. If not, the routine is ended. If yes, the current state is set to the error state and the routine is ended. Controls 314, when actuated, then identify and report the location of the sensing switches which sense the leading (forwardmost) edge of the rearmost wheel. In their operation, controls 314 determine whether any object has a footprint less than a preselected inputted valid minimum value, and if so, then that object is to be skipped over and not reported as a wheel (axle). Control module 316 then designates the sensor switch that is sensing the leading edge of the rear wheel as the rear trigger switch and sets the rear trigger indicator to on status, and then the routine is ended until the next cycle. If the check rear trigger control module 306 determines that the rear trigger indicator is on, then the starting point selector module 318 designates the rearmost on switch as the starting point switch. Control module 320 determines the location of the sensor/switch which senses the leading (forwardmost) edge of the rearmost wheel. In their operation, controls 320 determine whether any object has a footprint less than a preselected inputted valid minimum value, and if so, then that object is to be skipped over and not counted as a wheel (axle). Comparer 322 determines whether the sensor/switch which is sensing the leading edge of the rearmost wheel is the designated rear trigger switch. If yes, then the routine is ended until the next cycle. If not, then the truck has moved forward or backward on the scale and comparer 324 will determine whether the leading edge of the rear wheel (tire)/axle is now forward of the designated rear trigger switch. If not, then comparer 326 determines whether the front trigger switch is on. If affirmative, then module 328 sets the current state to be the error state and identifies an error. If negative, then control module 330 resets the rear trigger indicator to off and the routine is ended until the next cycle. If the comparer 324 determines that the leading edge of the rear tire/axle is now forward of the designated rear trigger switch, then selector 332 selects and identifies the sensor/switch just rearward of the leading edge of the rearmost axle and wheel. Comparer 334 then determines if that sensor/switch is the same as the designated rear trigger switch. If not, then the current state is set to be the error state and the routine is ended until the next cycle. If yes, then the length measurement control module 338 measures the length of the truck's wheelbase, does a footprint adjustment, and converts the length into feet and inches, and millimeters. Length measurement control module 338 measures and identifies the distance between the leading edge of the front tire (wheel) and the leading edge of the rear tire (wheel) and does some adjustments to the measured length based upon the difference between the measured footprints (chordal width) of the frontmost and rearmost wheels. Control 340 then sets the current state to the measurement valid state and sets the user application return code to show that the measurements are available for use by the other controls in the system. The trigger check controls routine is then ended until the next cycle.

In use, the driver of an unloaded/empty truck, such as an asphalt trailer insulated truck, drives his truck onto the platform for initial weigh-in. Upon entering the access ramp of the platform, the ramp's vehicle detector loop activates an audible alarm, such as a horn or bell, to alert officials or other employees of the refinery, truck terminal, or depot that a truck is entering its site. The truck is driven forward on the base of the platform until it reaches the end of the scale where a red stop light is activated and appears, warning the truck driver to stop so that the entire length of the truck will be stopped on the scale during weigh-in. The driver inserts his driver and weigh-in product identification cards into the identification card input reader. The scale measures the tare (unloaded/empty) weight of the truck and feeds (transmits) that information to the central processing unit and logic control box. The optical sensors (photoelectric cells) on the sides of the platform, in cooperation with the central processing unit and logic control box, detect the truck's overall length, wheelbase length, and chordal length of each outside tire (wheel) as well as the number and location of axles and outside tires (wheels) of the truck. The central processing unit and logic control box then: (1) determine the maximum authorized weight (legal limit) based upon the optically sensed number and location of the axles or tires of the truck as described above, and (2) determine how much the tare weight of the truck, as measured by the scale, is below the legal limit. Upon verification and approval of the inserted identification cards and of the measured weight, the driver receives a printed loading ticket from the printer.

The driver then goes to the loading rack (load site) indicated on his loading ticket and fills up his truck with product until the loaded gross weight of his truck is equal to or less than the maximum legal allowable loaded weight indicated on his loading ticket.

The driver then drives his truck back to the platform for weigh-out. Upon entering the platform, the access ramp's vehicle detection loop will activate an audible alarm, such as a horn or bell, to alert officials or employees of the refinery, truck terminal, or depot that a loaded truck is on the platform and ready to leave the facility. The truck is driven forward on the platform in a manner similar to weigh-in, until the truck reaches the end of the scale where a red stop light is activated and appears and the entire truck is on the scale. The driver inserts his driver and weigh-out product identification cards into the input reader. The scale measures the actual loaded, overall gross weight of the truck and transmits that information to the central processing unit. The optical sensors (photoelectric cells) on the sides of the platform again, in cooperation with the central processing unit and logic control box, can detect the truck's overall length, wheelbase length, and chordal length of each outside tire (wheel) as well as the number of axles and outside tires (wheels) of the truck. The central processing unit compares and verifies that the truck's length as well as its number and location of axles/tires is the same during weigh-out as during weigh-in to make sure the driver is using the same truck. Upon verification of the inserted identification cards and of the measured values, the driver receives a bill of lading if his truck's gross weight is less than the legal maximum allowed weight. If his truck's gross weight exceeds the legal maximum authorized weight, then the driver must dump the excess weight into a collection bin, tank, or reservoir and repeat the weigh-out procedure.

In order to enhance their use of the truck measuring system, truck drivers should drive as straight as possible on the truck platform, since a crooked, skewed, or angled truck may cause a lesser length to be detected by the sensors, which results in a smaller authorized allowable load under state highway regulations. Auxiliary guard rails may be placed at the access ramps to minimize skewed positioning of the truck when it enters upon the scale. Mud flaps should be shortened within allowable limits and/or prevented from bending upon the outside face of the tires which would cause the optical sensors to detect an unusual tire which would cause the central processing unit to send an error message to the printer. Trucks waiting in line should not tailgate or enter the platform's access ramp while another truck is on the scale because the central processing unit will simultaneously receive signals from both the scale and the ramp's vehicle detection loop and send an error message to the printer. If during weigh-in or weigh-out, the driver receives an error message that his truck is incorrectly positioned on the platform, then the driver should drive off the platform and properly re-enter the platform and re-start the weigh-in or weigh-out procedures.

In the applicants' truck measuring system which has been successfully installed and operated in Savannah, Georgia at the refinery of Amoco Oil Company, a wholly-owned subsidiary of Standard Oil Company (Indiana), under approval, authorization, and certification by officials of the Department of Transportation of the State of Georgia, less than one year before the filing date of this patent application, 99 retroreflective heavy duty photoelectric cells manufactured by the Micro Switch Division of Honeywell, model number PK 9062 0, are mounted on the sensor-supporting rail, which is approximately parallel to the longitudinal dimension of the platform to sense the truck's wheelbase length, the chordal length of the outside tires, and the number and location of axles and outside tires of each truck in cooperation with the central processing unit and logic control box. The photoelectric cells are mounted approximately 2 inches apart, center to center, near the ends of the platform for about four feet at each end, and at greater intervals of approximately 12 inches therebetween. The close spacing of the photoelectric cells at the ends of the platform provide for a sufficient amount of measurement precision. The larger mounting intervals between the ends of the platform reduce the number of photoelectric sensors required without affecting measurement precision, thereby enhancing the economy of the truck measuring system. Each photoelectric cell is aimed at one of the 99 corresponding retroreflectors mounted on a parallel supporting rail, so that each infrared light beam traverses horizontally above the platform at about a 90° angle to the longitudinal dimension of the platform. The photoelectric cells are mounted 6 inches above the ground. The locations of the sensors and of other switches and indicators (lights, etc.) are approximately symmetrical with respect to the transverse center line of the scale, thereby permitting trucks to enter the platform from either end, to provide more efficient bi-directional flow of truck traffic. A Fairbanks-Morse weighing instrument is used as part of the scale. An IBM 4955 Series I computer is used in the central processing unit. Vehicle detector loops produced by the Security Products Division of Federal Signal Corporation are installed in the ramps. The maximum allowable legal weights for various size trucks were inputted into the central processing unit in accordance with the following formula from the Georgia Department of Transportation:

$$W = 500 [LN \div (N-1) + 12N + 36]$$

where W equals the maximum allowable gross weight of the truck. L equals the length of the truck in feet. N equals the number of axles of the truck. The maximum permissible gross loads for various size vehicles and axle groupings listed in Article 2, Chapter 6 of Title 32 of the Official Code of Georgia Annotated, S.B. 260, which are hereby incorporated by reference, were also inputted into the central processing unit. The length of the base of the platform and scale is 60 feet. The lateral width or span between the guard rails is 12 feet 5 inches.

The automatic truck measuring system at the Savannah, Georgia refinery of Amoco Oil Company weighs and processes an average of 50 to 60 trucks of asphalt per day and as much as 80 trucks of asphalt per day during the height of the construction/road paving season. Insulated asphalt tanker/trailer trucks can carry loads of hot asphalt 6 to 8 hours or more without detriment before unloading. Since many of the trucks carry and deliver their loads to other states such as South Carolina, Tennessee, etc., most of the loading and measuring is done from midnight to 6 a.m. in the morning at the refinery with only two Amoco Oil employees present. The novel truck measuring system operates efficiently, effectively, reliably, and automatically. It has improved relationships with customers, truck drivers, employees, and law enforcement officials. It has also saved on valuable labor costs and time.

Although embodiments of this invention have been shown and described, it is to be understood that various modifications and substitutions, as well as rearrangements of equipment, parts, components, and/or process steps, can be made without departing from the novel spirit and scope of this invention.

What is claimed is:

1. An automatic truck measuring system, comprising:
   a truck-supporting platform having elongated sides, at least one inclined entrance ramp for access of a truck and a scale for determining the actual gross weight of said truck, said ramp containing a vehicle detector loop;
   an identification badge input reader and scanner for reading a driver identification card of the truck driver and a product identification card selected by said truck driver to indicate the product the driver wants loaded in his truck;
   optical sensing and detection means comprising photoelectric cells mounted to said sides of said platform at a sufficient height to sense and detect the position and number of axles or outside tires of said truck and the wheelbase length of said truck between its front and rear axles;
   a central processing unit comprising a computer operatively connected to said scale, said identification badge input reader and scanner, and said optical sensing and detection means for determining the maximum allowable loaded weight of said truck under state law and regulations based upon said number of axles or outside tires of said truck and its wheelbase length and for comparing said maximum allowable loaded weight with said actual gross weight of said truck; and
   printing means operatively connected to said central processing unit for printing and dispensing a bill of lading if said actual gross weight is less than said maximum allowable loaded weight, said bill of lading containing and indicating said actual gross weight, the name of said truck driver, the type of product loaded into said truck, the specific gravity of said product, and said maximum allowable loaded weight.

2. An automatic truck measuring system in accordance with claim 1 wherein said scale includes means for determining the unloaded weight of said truck before said truck receives its load of material and the actual loaded weight of said truck after said truck receives its load of material and said central processing unit includes means for determining the maximum allowable load of said truck under applicable state law and regulations in response to said unloaded weight of said truck and the number of axles or outside tires of said truck and the wheelbase length of said truck and triggering means for actuating said printer to print and dispense a loading ticket indicating said maximum allowable load.

3. An automatic truck measuring system in accordance with claim 2 including dispensing and control means operatively connected to said central processing unit for dispensing only a load of material less than said maximum allowable load into said truck.

4. An automatic truck measuring system in accordance with claim 2 wherein said load of material comprises asphalt.

5. An automatic truck measuring system in accordance with claim 1 wherein said central processing unit includes means for determining the length of said truck based upon the location of said axles or tires of said truck.

6. An automatic truck measuring system in accordance with claim 1 including visual indicating and display means comprising a red indicating light for indicating when said truck is fully on said scale for commencing weighing of said truck and said sensing of said wheelbase length and a digital readout display panel for indicating the actual gross weight of said truck in pounds.

7. An automatic truck measuring process, comprising the steps of:
   (a) optically sensing the wheelbase length of a truck between its front and rear axles with photoelectric cells;
   (b) automatically determining the maximum allowable loaded weight of said truck under state law and regulations with a central processing unit based upon said optically sensed wheelbase length of said truck;
   (c) weighing said truck;
   (d) electronically comparing the weight of said truck in step (c) with said maximum allowable loaded weight of said truck in step (b); and
   (e) printing a bill of lading if said weight of said truck is less than said maximum allowable weight.

8. An automatic truck measuring process in accordance with claim 7 including dispensing a petroleum product from a loading rack into said truck, said petroleum product selected from the group consisting of oil, gasoline, and asphalt.

9. An automatic truck measuring process in accordance with claim 7 wherein said weighing includes weighing said truck before said truck receives its load of material, determining the maximum legal quantity of said load of material said truck can carry with said central processing unit, and automatically metering and dispensing an amount of material less than said maximum legal quantity into said truck.

10. An automatic truck measuring process in accordance with claim 7 including displaying a signal light to the driver of said truck when said measured weight exceeds said maximum allowable weight.

11. An automatic truck measuring process in accordance with claim 7 including electrically verifying that the number of axles of said truck during weigh-out and weigh-in are the same to help assure that the same truck is weighing-out as weighed-in.

12. An automatic truck measuring process in accordance with claim 7 wherein said sensing includes sensing at least a substantial portion of the diameter of each outside tire of said truck and electronically verifying that each outside tire comes within acceptable limits.

* * * * *